United States Patent
Li et al.

(10) Patent No.: US 8,472,212 B2
(45) Date of Patent: Jun. 25, 2013

(54) RESONANT CONVERTING DEVICE, AND CONTROL MODULE AND METHOD FOR CONTROLLING A RESONANT CONVERTER

(75) Inventors: Ming-Zhu Li, Nanjing (CN); Jing-Yan Li, Nanjing (CN); Qing-Lin Zhao, Nanjing (CN); Zhi-Hong Ye, Nanjing (CN); Chun-Lin Zhang, Nanjing (CN)

(73) Assignees: Silitek Electronic (Guangzhou) Co., Ltd., Guangzhou (CN); Lite-On Technology Corp., Taipei (TW)

( * ) Notice: Subject to any disclaimer, the term of this patent is extended or adjusted under 35 U.S.C. 154(b) by 376 days.

(21) Appl. No.: 12/890,921

(22) Filed: Sep. 27, 2010

(65) Prior Publication Data

US 2011/0249473 A1   Oct. 13, 2011

(30) Foreign Application Priority Data

Apr. 7, 2010  (CN) .......................... 2010 1 0149611

(51) Int. Cl.
*H02M 3/335*   (2006.01)
(52) U.S. Cl.
USPC .................................... 363/21.02; 363/21.03

(58) Field of Classification Search
USPC .............................. 363/21.02, 21.03; 323/283
See application file for complete search history.

(56) References Cited

U.S. PATENT DOCUMENTS

| | | | |
|---|---|---|---|
| 6,912,137 B2 * | 6/2005 | Berghegger | 363/21.03 |
| 7,466,110 B2 * | 12/2008 | Tsuruya | 323/282 |
| 2009/0079408 A1 * | 3/2009 | Qiao et al. | 323/283 |
| 2009/0218994 A1 * | 9/2009 | Liu et al. | 323/234 |

* cited by examiner

*Primary Examiner* — Jue Zhang
(74) *Attorney, Agent, or Firm* — Rosenberg, Klein & Lee (57) ABSTRACT

A method for controlling operation of a resonant converter is to be implemented by a control module that generates a drive signal for controlling a power switch of the resonant converter to thereby control an output voltage and an output current provided by the resonant converter to a load. The method includes: (A) configuring the control module to determine if the load is operating in a first mode or a second mode; (B) configuring the control module to generate the drive signal according to the output voltage when the control module determines that the load is operating in the first mode; and (C) configuring the control module to generate the drive signal according to the output current when the control module determines that the load is operating in the second mode.

19 Claims, 6 Drawing Sheets

RESONANT CONVERTING DEVICE, AND CONTROL MODULE AND METHOD FOR CONTROLLING A RESONANT CONVERTER

CROSS-REFERENCE TO RELATED APPLICATION

This application claims priority of Chinese Application No. 201010149611.4, filed on Apr. 7, 2010.

BACKGROUND OF THE INVENTION

1. Field of the Invention

The present invention relates to a control method, more particularly to a method for controlling a resonant converter.

2. Description of the Related Art

Figure 1:
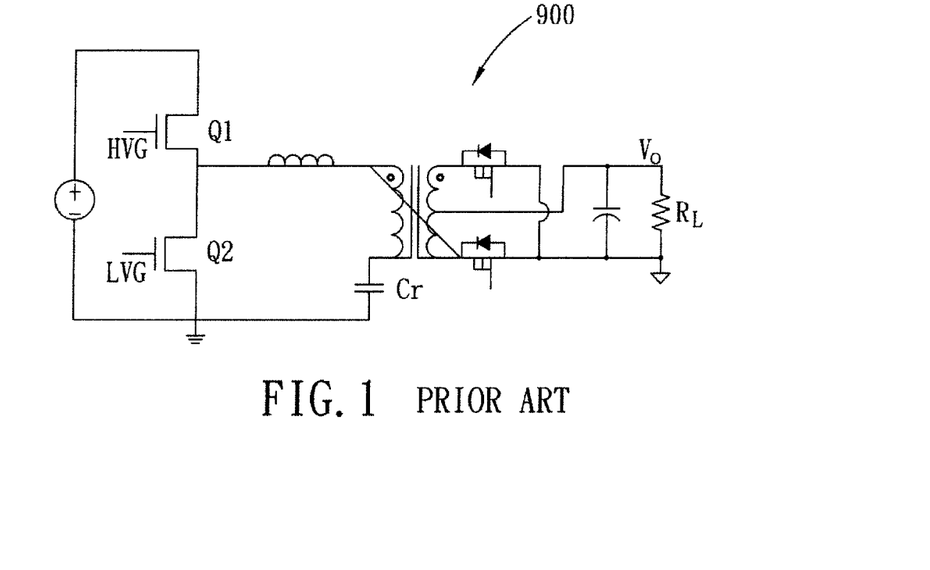
FIG. 1 is a circuit diagram illustrating a conventional half-bridge LLC resonant converter.

Shown in FIG. 1 is a conventional half-bridge LLC resonant converter 900 including first and second power switches Q1, Q2, and operable for generating an output voltage $V_O$. When the LLC resonant converter 900 is connected to a load $R_L$ that is excessively large or is shorted-circuited, the LLC resonant converter 900 will output a large current that may damage electronic components. Furthermore, during the soft-start stage, the output voltage $V_O$ generated by the LLC resonant converter 900 has low linearity, which hinders the use of the LLC resonant converter 900 in some applications such as servers.

Figure 2:
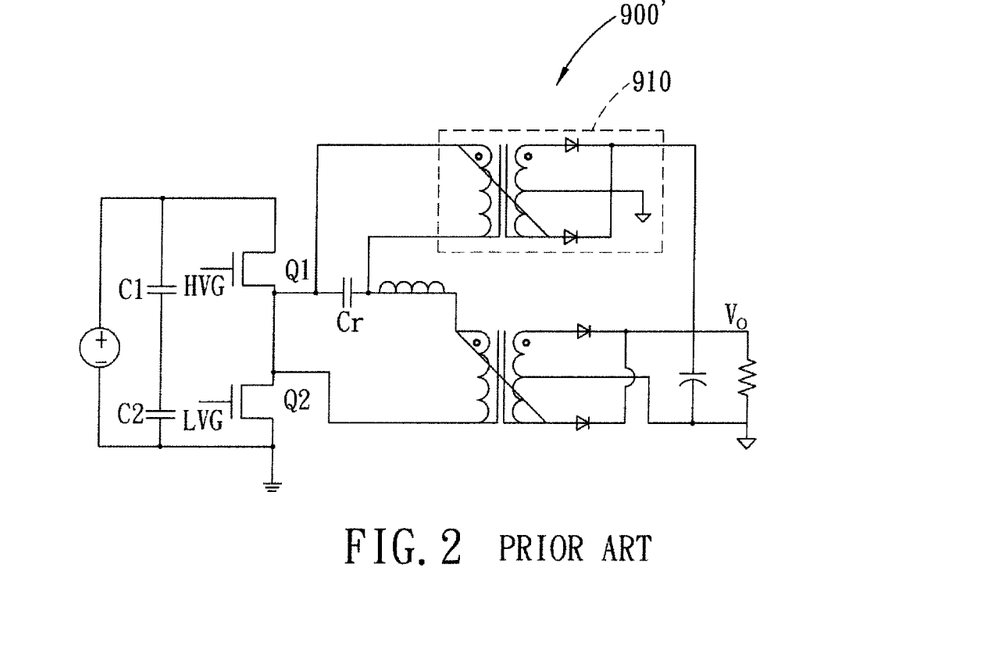
FIG. 2 is a circuit diagram illustrating another conventional half-bridge LLC resonant converter that employs a current-limiting circuit.

Shown in FIG. 2 is another conventional LLC resonant converter 900' that employs a current-limiting circuit 910 for limiting voltage of a resonant capacitor $C_r$ of the resonant converter 900' so as to limit an output current of the resonant converter 900'. However, during actual operation, energy stored by the resonant capacitor $C_r$ can still be transferred to the output side of the LLC resonant converter 900' via the current-limiting circuit 910. As a result, the output current of the LLC resonant converter 900' is not limited precisely. Moreover, use of the current-limiting circuit 910 does not improve linearity of an output voltage $V_O$ of the LLC resonant converter 900' during the soft-start stage of the LLC resonant converter 900'.

SUMMARY OF THE INVENTION

Therefore, an object of the present invention is to provide a method for controlling operation of a resonant converter capable of current-limiting when the resonant converter is overloaded or when an output of the resonant converter device is short-circuited.

According to the present invention, a method for controlling operation of a resonant converter is to be implemented by a control module that generates a drive signal for controlling a power switch of the resonant converter to thereby control an output voltage and an output current provided by the resonant converter to a load. The method includes: (A) configuring the control module to determine if the load is operating in a first mode or a second mode; (B) configuring the control module to generate the drive signal according to the output voltage when the control module determines that the load is operating in the first mode; and (C) configuring the control module to generate the drive signal according to the output current when the control module determines that the load is operating in the second mode.

Another object of the present invention is to provide a method for controlling operation of a resonant converter capable of enhancing linearity of an output voltage generated during the soft-start stage of the resonant converter.

According to another aspect of the present invention, a method for controlling operation of a resonant converter is to be implemented by a control module so as to control an output voltage and an output current provided by the resonant converter to a load. The method includes: (A) configuring the control module to generate a drive signal for controlling a power switch of the resonant converter to thereby control the output voltage and the output current provided by the resonant converter, the drive signal having an initial duty cycle and an initial frequency; (B) configuring the control module to adjust the duty cycle of the drive signal according to the output voltage; and (C) if the duty cycle of the drive signal has reached a predetermined duty cycle and the output voltage has yet to reach a predetermined working voltage, configuring the control module to adjust frequency of the drive signal according to the output voltage such that the output voltage is able to reach the predetermined working voltage.

Yet another object of the present invention is to provide a control module capable of enhancing linearity of an output voltage generated during the soft-start stage of a resonant converter.

According to yet another aspect of the present invention, there is provided a control module adapted for use with a resonant converter and operable to generate a drive signal for driving operation of a power switch of the resonant converter to thereby control an output voltage and an output current generated by the resonant converter. The control module includes a voltage subtractor, a voltage regulator, a current subtractor, a current regulator, a comparator, a control circuit, and a driving circuit.

The voltage subtractor is for generating an error voltage from a difference between the output voltage and a reference voltage. The voltage regulator is for generating a voltage-frequency signal corresponding to frequency of the drive signal based on the error voltage.

The current subtractor is for generating an error current from a difference between the output current and a reference current. The current regulator is for generating a current-frequency signal corresponding to the frequency of the drive signal based on the error current.

The comparator is for comparing the voltage-frequency signal with the current-frequency signal. The driving circuit is for generating the drive signal.

The control circuit is for controlling the driving circuit to generate the drive signal according to the output voltage when it is determined by the comparator that magnitude of the voltage-frequency signal is smaller than that of the current-frequency signal, and is for controlling the driving circuit to generate the drive signal according to the output current when it is determined by the comparator that the magnitude of the voltage-frequency signal is greater than that of the current-frequency signal.

A further object of the present invention is to provide a resonant converting device capable of current-limiting when overloaded or when an output of the resonant converting device is short-circuited.

According to a further aspect of the present invention, there is provided a resonant converting device including a resonant converter and a control module.

The resonant converter is for generating an output voltage and an output current and has a power switch.

The control module is for generating a drive signal for driving operation of the power switch of the resonant converter to thereby control the output voltage and the output current generated by the resonant converter. The control module includes a voltage subtractor, a voltage regulator, a current subtractor, a current regulator, a comparator, a control circuit, and a driving circuit.

The voltage subtractor is for generating an error voltage from a difference between the output voltage and a reference voltage. The voltage regulator is for generating a voltage-frequency signal corresponding to frequency of the drive signal based on the error voltage.

The current subtractor is for generating an error current from a difference between the output current and a reference current. The current regulator is for generating a current-frequency signal corresponding to the frequency of the drive signal based on the error current.

The comparator is for comparing the voltage-frequency signal with the current-frequency signal. The driving circuit is for generating the drive signal.

The control circuit is for controlling the driving circuit to generate the drive signal according to the output voltage when it is determined by the comparator that magnitude of the voltage-frequency signal is smaller than that of the current-frequency signal, and is for controlling the driving circuit to generate the drive signal according to the output current when it is determined by the comparator that the magnitude of the voltage-frequency signal is greater than that of the current-frequency signal.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 3:
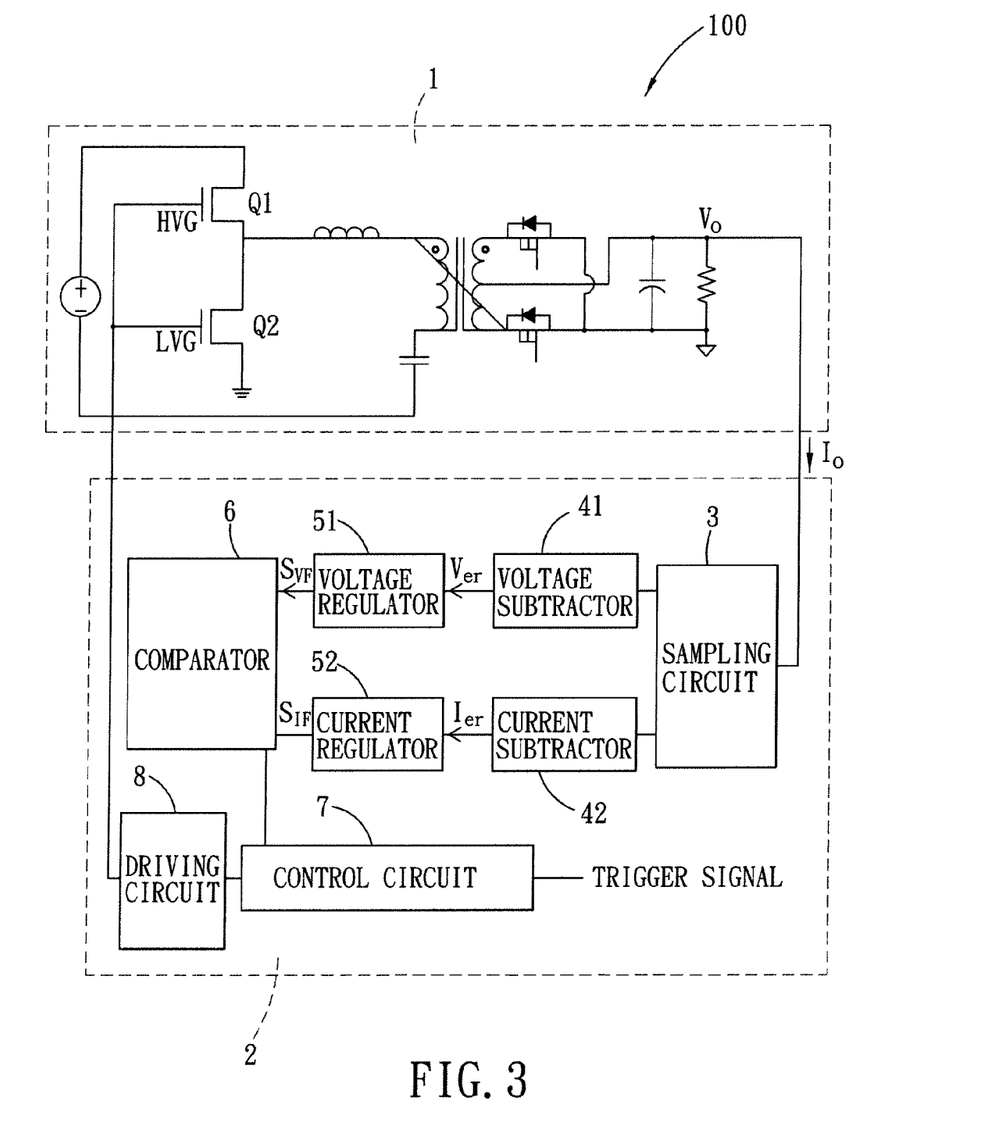
FIG. 3 is a diagram illustrating the preferred embodiment of a resonant converting device according to the present invention.

Referring to FIG. 3, the preferred embodiment of a resonant converting device 100 according to the present invention includes a resonant converter 1 and a control module 2 that is coupled to the resonant converter 1 for controlling an output voltage $V_O$ and an output current $I_O$ to be outputted to a load $R_L$ by the resonant converter 1. The resonant converting device 100 is applicable to servers, workstations, communication devices, desktop computers, gaming consoles, flat panel televisions, etc. In the present embodiment, the resonant converter 1 is a half-bridge LLC resonant converter coupled to the control module 2 to form a closed loop, and includes first and second power switches Q1, Q2.

The control module 2 includes a sampling circuit 3, a voltage subtractor 41, a voltage regulator 51, a current subtractor 42, a current regulator 52, a comparator 6, a control circuit 7, and a driving circuit 8. In the present embodiment, the voltage regulator 51 and the current regulator 52 are proportional integral controllers, and the driving circuit 8 can be one of a pulse-width modulation module and a voltage-controller oscillator. However, configuration of the control module 2 is not limited to such.

Figure 4A:
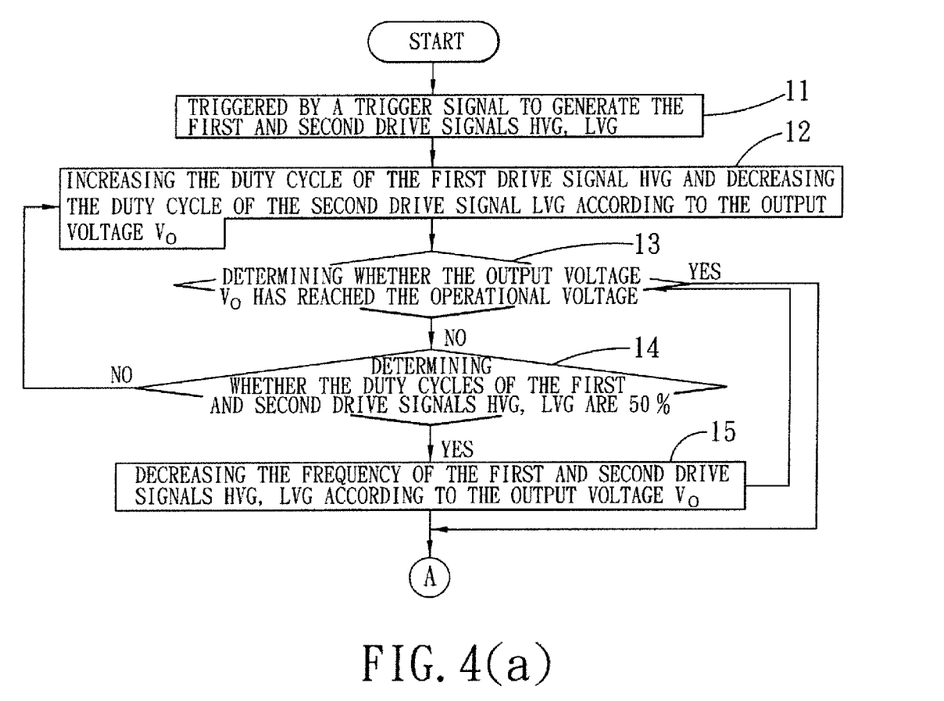
FIGS. 4(a) and 4(b) are flowcharts illustrating the preferred embodiment of a method, according to the present invention, to be performed by a control module of the resonant converting device for controlling operation of a resonant converter of the resonant converting device.
Figure 4B:
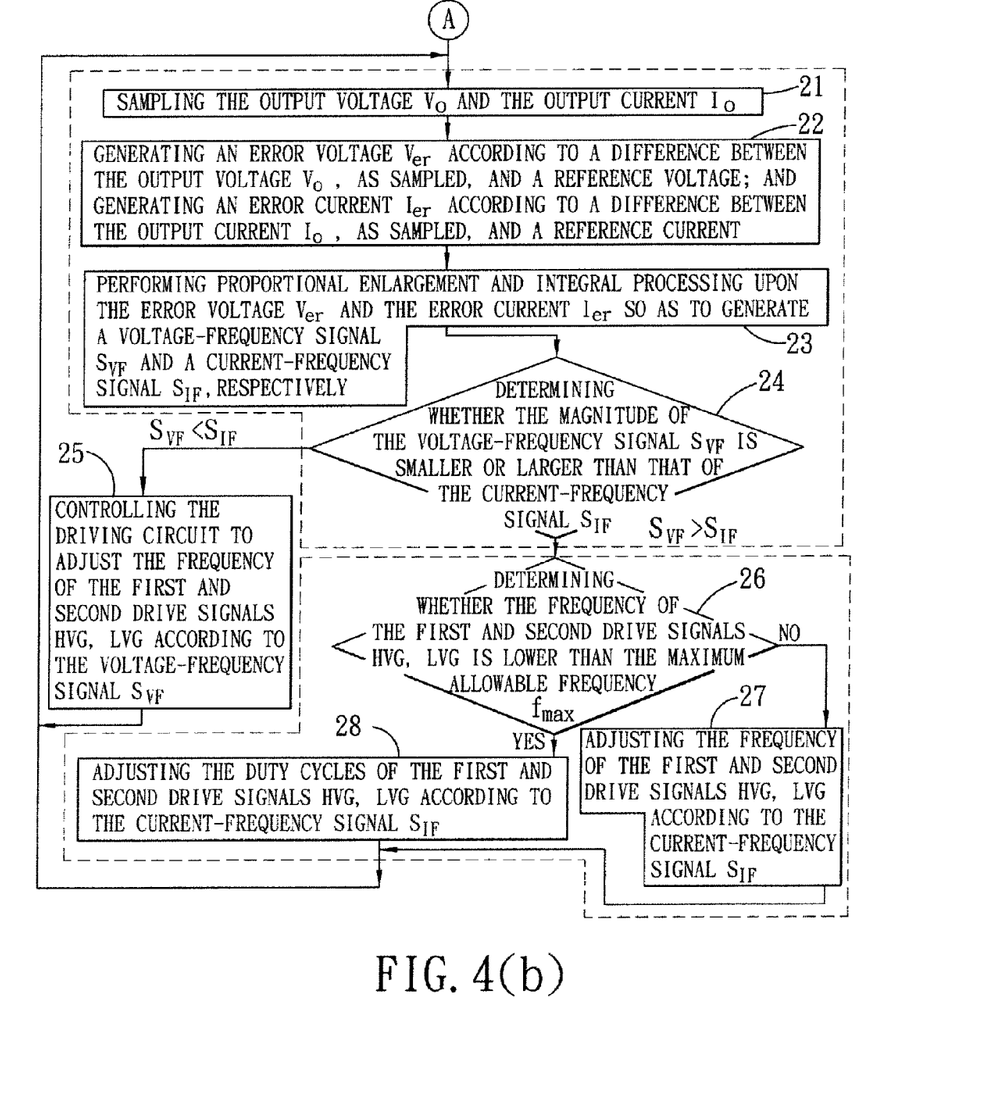

Referring to FIGS. 4(a) and 4(b), the control module 2 is configured to perform the preferred embodiment of a method, according to the present invention, to generate first and second drive signals HVG, LVG for controlling switching of the first and second power switches Q1, Q2, respectively, thereby controlling the resonant converter 1 to output the output voltage $V_O$ with high linearity during the soft-start stage, and limiting the output current $I_O$ in an event of over-current at the load $R_L$ or when the output of the resonant converter 1 is short-circuited. The resonant converter 1 is operable in a soft-start mode and an operational mode, and is controlled by the control module 2 to operate in the soft-start mode during the soft-start stage.

Figure 5:
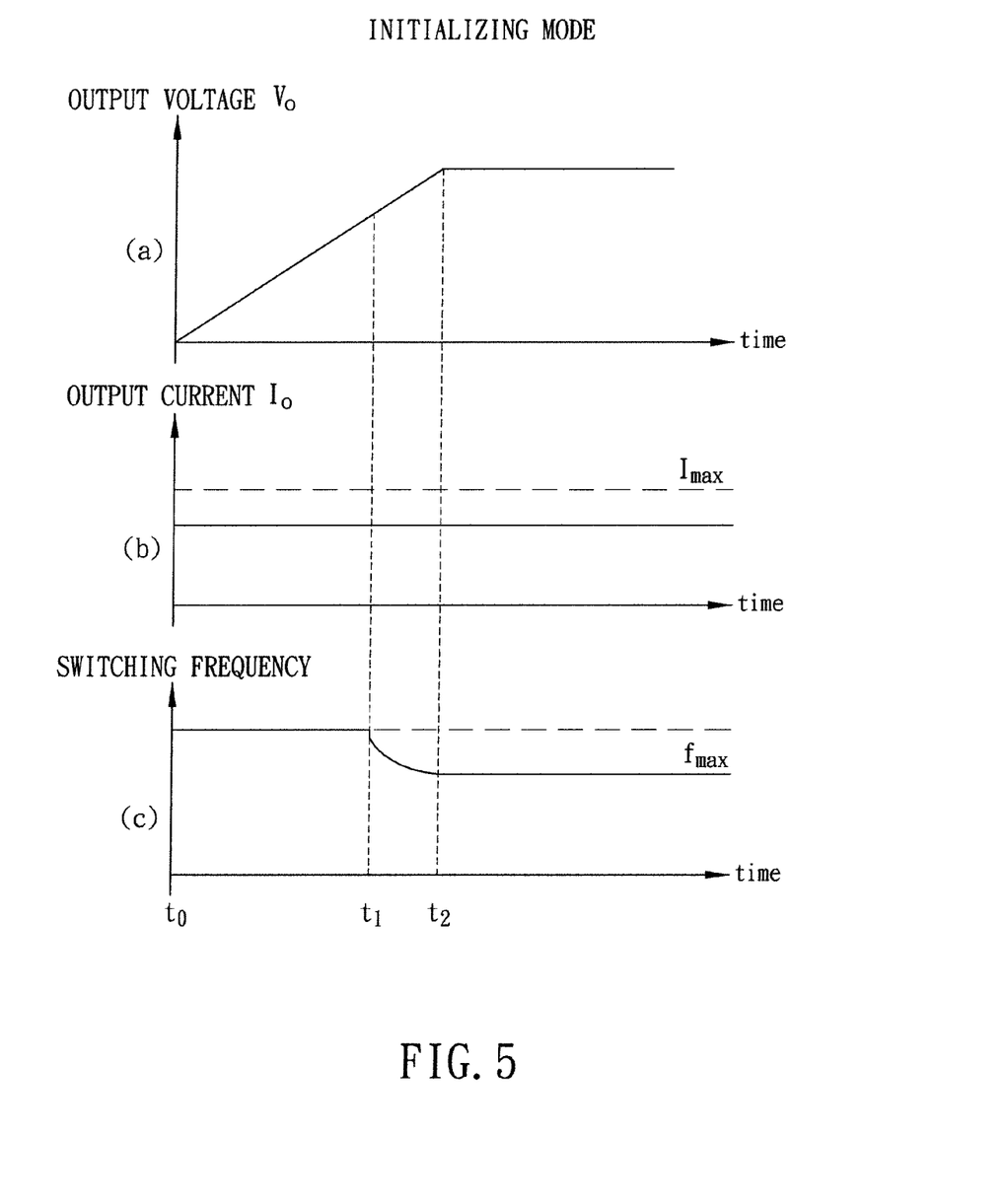
FIG. 5 is a timing diagram illustrating an output voltage and an output current of the resonant converter, and a switching frequency of first and second power switches of the resonant converter when the resonant converter operates in the soft-start mode.

Soft-Start Mode:

With further reference to FIG. 5, while the resonant converter 1 is operating in the soft-start mode, the control module 2 of the present embodiment is configured to perform steps 11 to 15 of the method so as to cause the output voltage $V_O$ to increase linearly from zero to an operational voltage (duration between $t_0$ to $t_2$) with the assumption that the electrical characteristics of the load $R_L$ remain unchanged while the resonant converter 1 is operating in this mode.

In step 11, the control circuit 7 is triggered by a trigger signal to control the driving circuit 8 to generate the first and second drive signals HVG, LVG. In the present embodiment, the first and second drive signals HVG, LVG are complementary signals having respective initial duty cycles of 0% and 100%, and having an initial frequency that is a maximum allowable frequency $f_{max}$ for the first and second drive signals HVG, LVG.

In step 12, the control circuit 7 is configured to control the driving circuit 8 to increase the duty cycle of the first drive signal HVG and to decrease the duty cycle of the second drive signal LVG according to the output voltage $V_O$ so as to cause the output voltage $V_O$ to increase linearly. It is to be noted that, in the present embodiment, the load $R_L$ is exemplified as a test device that operates in a constant-current mode, in which the load $R_L$ is regulated online to receive a constant-magnitude current $I_O$ from the resonant converter 1,. Moreover, when the resonant converter 1 is operating in the soft-start mode, the output current $I_O$ and the frequency of the first and second drive signals HVG, LVG remain unchanged during adjustment of the duty cycles by the control circuit 7. Furthermore the duty cycles of the first and second drive signals HVG, LVG are controlled to be lower and higher than 50%, respectively.

In step 13, the control circuit 7 is configured to determine whether the output voltage $V_O$ has reached the operational voltage, to proceed to step 21 to thereby control the resonant converter 1 to operate in the operational mode if affirmative, and to proceed to step 14 if otherwise.

In step 14, the control circuit 7 is configured to determine whether the duty cycles of the first and second drive signals HVG, LVG are 50%, to proceed to step 15 if affirmative, and to proceed to step 12 if otherwise. It is to be noted that the first time the control circuit 7 proceeds to step 15 is denoted by time $t_1$.

In step 15, the control circuit 7 is configured to control the driving circuit 8 to decrease the frequency of the first and second drive signals HVG, LVG according to the output voltage $V_O$ to thereby increase the output voltage $V_O$ while maintaining the output current $I_O$ at the same magnitude, and to proceed to step 13. It is to be noted that the duty cycles of the first and second drive signals HVG, LVG are maintained at 50% in this step.

Figure 6:
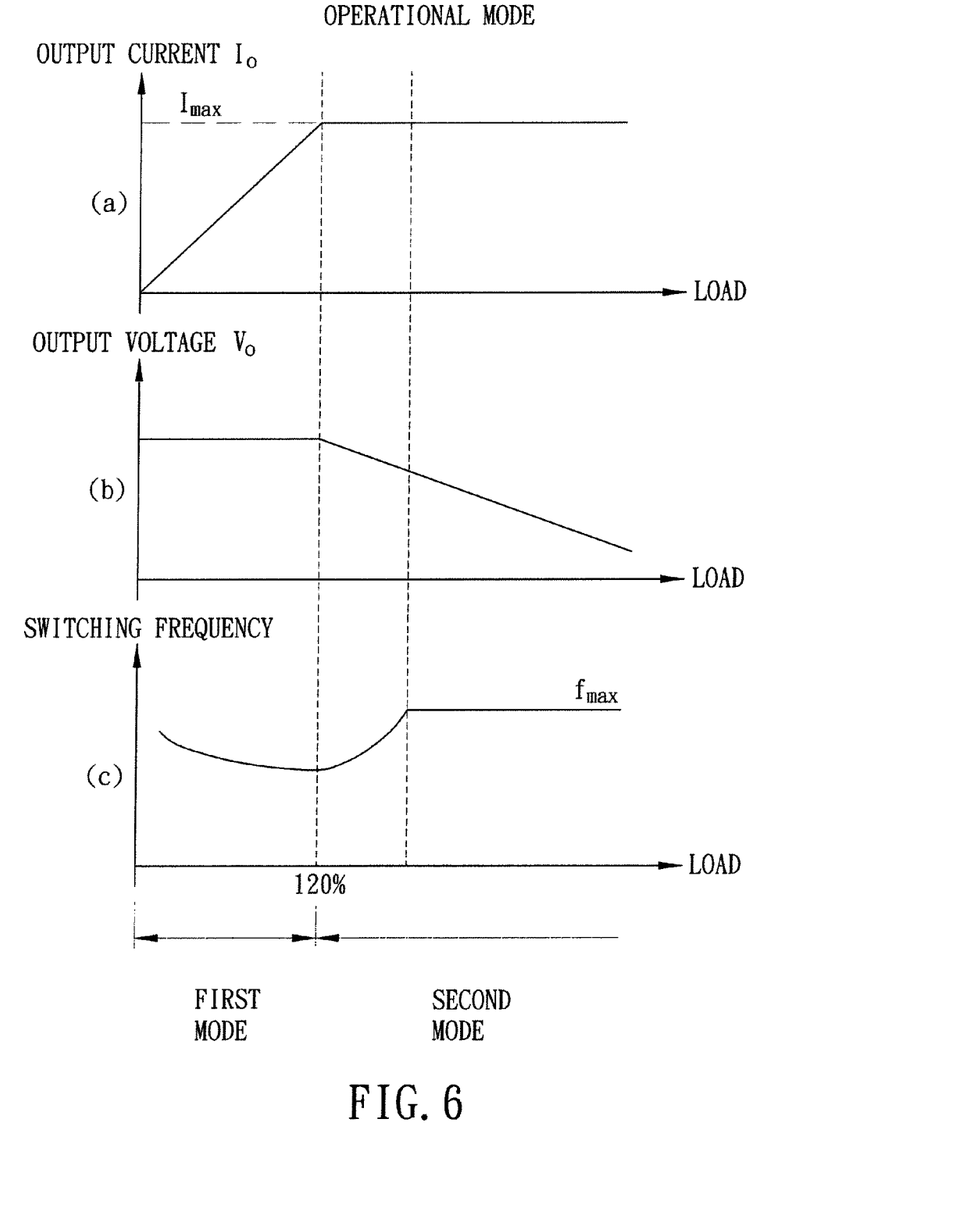
FIG. 6 is a timing diagram illustrating the output voltage and the output current of the resonant converter, and the switching frequency of the first and second power switches or the resonant converter when the resonant converter operates in an operational mode.

Operational Mode:

With further reference to FIG. 6, while the resonant converter 1 is operating in the operational mode, the control circuit 7 is configured to perform steps 21 to 28 to generate the first and second drive signals HVG, LVG according to the output voltage $V_O$ when the load $R_L$ is operating in a first mode, and according to the output current $I_O$ when the load $R_L$ is operating in a second mode. In the present embodiment, the load $R_L$ exceeds 0% and does not exceed a predetermined threshold percentage (e.g., 120%) of the rated load of the resonant converter 1 when the load $R_L$ is operating in the first mode, and the load $R_L$ exceeds the predetermined threshold percentage of the rated load of the resonant converter 1 when the load $R_L$ is operating in the second mode. It is to be noted that 0% of the rated load of the resonant converter 1 occurs when the load $R_L$ is not connected to the resonant converter 1.

In step 21, the sampling circuit 3 samples the output voltage $V_O$ and the output current $I_O$.

In step 22, the voltage subtractor 41 generates an error voltage $V_{er}$ according to a difference between the output voltage $V_O$, as sampled by the sampling circuit 3, and a reference voltage. The current subtractor 42 generates an error current $I_{er}$ according to a difference between the output current $I_O$, as sampled by the sampling circuit 3, and a reference current. In the present embodiment, the reference current is a maximum allowable current $I_{max}$ for the resonant converter 1.

In step 23, the voltage regulator 51 performs proportional enlargement and integral processing upon the error voltage $V_{er}$ so as to generate a voltage-frequency signal $S_{VF}$. The current regulator 52 performs proportional enlargement and integral processing upon the error current $I_{er}$ so as to generate a current-frequency signal $S_{IF}$. The voltage-frequency signal $S_{VF}$ and the current-frequency signal $S_{IF}$ correspond to the frequency of the first and second drive signals HVG, LVG.

In step 24, the comparator 6 is operable to compare magnitude of the voltage-frequency signal $S_{VF}$ and that of the current-frequency signal $S_{IF}$, and to provide a result of the comparison to the control circuit 7. The control circuit 7 is configured to determine that the load $R_L$ is operating in the first mode and to proceed to step 25 if the magnitude of the voltage-frequency signal $S_{VF}$ is smaller than or equal to that of the current-frequency signal $S_{IF}$, and to determine that the load $R_L$ is operating in the second mode and to proceed to step 26 if the magnitude of the voltage-frequency signal $S_{VF}$ is greater than that of the current-frequency signal $S_{IF}$ (i.e., if the load $R_L$ exceeds the predetermined threshold percentage of the rated load of the resonant converter 1).

In step 25, the control circuit 7 is configured to control the driving circuit 8 to adjust the frequency of the first and second drive signals HVG, LVG according to the voltage-frequency signal $S_{VF}$. It is to be noted that, in the present embodiment, magnitude of the voltage-frequency signal $S_{VF}$ has an inverse relation to the frequency of the first and second drive signals HVG, LVG. Therefore, when the load $R_L$ is operating in the first mode, as the output voltage $V_O$ increases, the difference between the output voltage $V_O$ and the reference voltage decreases, the error voltage $V_{er}$ decreases, and the voltage-frequency signal $S_{VF}$ decreases such that the frequency of the first and second drive signals HVG, LVG increases, thereby causing the output voltage $V_O$ to decrease and be stabilized at a certain level.

In step 26, the control circuit 7 is configured to determine whether the frequency of the first and second drive signals HVG, LVG is lower than the maximum allowable frequency $f_{max}$, to proceed to step 27 if affirmative, and to proceed to step 28 if otherwise.

In step 27, the control circuit 7 is configured to control the driving circuit 8 to adjust the frequency of the first and second drive signals HVG, LVG according to the current-frequency signal $S_{IF}$.

In step 28, the control circuit 7 is configured to adjust the duty cycles of the first and second drive signals HVG, LVG according to the current-frequency signal $S_{IF}$.

During actual operation, when the resonant converter 1 is operating in the operational mode and the load $R_L$ is operating in the second mode, magnitude of the error current $I_{er}$ will be not be larger than that of the error voltage $V_{er}$, and magnitude of the current-frequency signal $S_{IF}$ will not be larger than that of the voltage-frequency signal $S_{VF}$ such that the control circuit 7 will perform one of steps 27 and 28, depending on the frequency of the first and second drive signals HVG, LVG. Since the current-frequency signal $S_{IF}$ also has an inverse relation no the frequency of the first and second drive signals HVG, LVG, in order to stabilize the output current $I_O$ at the maximum allowable current $I_{max}$ while reducing magnitude of the output voltage $V_O$, the control circuit 7 will control the driving circuit 8 to increase the frequency of the first and second drive signals HVG, LVG if the frequency of the first and second drive signals HVG, LVG is lower than the maximum allowable frequency $I_{max}$ (step 27), and will decrease and increase the duty cycles of the first and second drive signals HVG, LVG, respectively, if otherwise (step 28). Such operation can protect the load $R_L$ from being damaged by over-current.

Furthermore, the method for controlling the output voltage $V_O$ and the output current $I_O$, according to the present invention, can be realized in the form of firmware or by configuring the control module 2 with proprietary program instructions.

In summary, the control module 2 is configured to perform the preferred embodiment of a method, according to the present invention, for controlling the output voltage $V_O$ and the output current $I_O$ provided by the resonant converter 1 to the load $R_L$ such that the output voltage $V_O$ has relatively high linearity during the soft-start stage of the resonant converter 1, and that the resonant converter is prevented from being damaged by over-current.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for controlling operation of a resonant converter, the method to be implemented by a control module that generates a drive signal for controlling a power switch of the resonant converter to thereby control an output voltage and an output current provided by the resonant converter to a load, said method comprising:
    (A) configuring the control module to determine if the load is operating in a first mode or a second mode;

(B) configuring the control module to generate the drive signal according to the output voltage when the control module determines that the load is operating in the first mode; and (C) configuring the control module to generate the drive signal according to the output current when the control module determines that the load is operating in the second mode;

wherein step (A) includes:

configuring the control module to generate a voltage-frequency signal according to a difference between the output voltage and a predetermined reference voltage;

configuring the control module to generate a current-frequency signal according to a difference between the output current and a predetermined reference current; and configuring the control module to determine that the load is operating in the first mode if magnitude of the voltage-frequency signal is smaller than that of the current-frequency signal, and to determine that the load is operating in the second mode if the magnitude of the voltage-frequency signal is greater than that of the current-frequency signal.

2. The method as claimed in claim 1, wherein, in step (B), the control module is configured to generate the drive signal corresponding to frequency of the voltage-frequency signal.

3. The method as claimed in claim 1, wherein, in step (C), the control module is configured to generate the drive signal corresponding to frequency of the current-frequency signal.

4. The method as claimed in claim 1, wherein step (C) includes:

configuring the control module to adjust frequency of the drive signal according to the output current if the frequency of the drive signal is lower than a predetermined maximum frequency; and configuring the control module to adjust duty cycle of the drive signal according to the output current if otherwise.

5. A computer program product comprising a computer-readable storage medium that comprises program instructions which, when executed, cause a control module coupled to a resonant converter to perform consecutive steps of a method for controlling operation of a resonant converter according to claim 1.

6. A method for controlling operation of a resonant converter, the method to be implemented by a control module so as to control an output voltage and an output current provided by the resonant converter to a load, said method comprising:

(A) configuring the control module to generate a drive signal for controlling a power switch of the resonant converter to thereby control the output voltage and the output current provided by the resonant converter, the drive signal having an initial duty cycle and an initial frequency;

(B) configuring the control module to adjust the duty cycle of the drive signal according to the output voltage;

(C) if the duty cycle of the drive signal has reached a predetermined duty cycle and the output voltage has yet to reach a predetermined working voltage, configuring the control module to adjust frequency of the drive signal according to the output voltage such that the output voltage is able to reach the predetermined working voltage;

(D) configuring the control module to determine if the load is operating in a first mode or a second mode;

(E) configuring the control module to generate the drive signal according to the output voltage when the control module determines that the load is operating in the first mode; and (F) configuring the control module to generate the drive signal according to the output current when the control module determines that the load is operating in the second mode;

wherein step (D) includes:

configuring the control module to generate a voltage-frequency signal according to a difference between the output voltage and a predetermined reference voltage;

configuring the control module to generate a current-frequency signal according to a difference between the output current and a predetermined reference current; and configuring the control module to determine that the load is operating in the first mode if magnitude of the voltage-frequency signal is smaller than that of the current-frequency signal, and to determine that the load is operating in the second mode if the magnitude of the voltage-frequency signal is greater than that of the current-frequency signal.

7. The method as claimed in claim 6, wherein the initial frequency is a maximum allowable frequency for the drive signal.

8. The method as claimed in claim 6, wherein, in step (E), the control module is configured to generate the drive signal corresponding to frequency of the voltage-frequency signal.

9. The method as claimed in claim 6, wherein, in step (F), the control module is configured to generate the drive signal corresponding to frequency of the current-frequency signal.

10. The method as claimed in claim 9, wherein step (F) includes:

configuring the control module to adjust the frequency of the drive signal according to the output current if the frequency of the drive signal is lower than a predetermined maximum frequency; and configuring the control module to adjust the duty cycle of the drive signal according to the output current if otherwise.

11. A computer program product comprising a computer-readable storage medium that comprises program instructions which, when executed, cause a control module coupled to a resonant converter to perform consecutive steps of a method for controlling operation of a resonant converter according to claim 6.

12. A control module adapted for use with a resonant converter and operable to generate a drive signal for driving operation of a power switch of the resonant converter to thereby control an output voltage and an output current generated by the resonant converter, said control module comprising:

a voltage subtractor for generating an error voltage from a difference between the output voltage and a reference voltage;

a voltage regulator for generating a voltage-frequency signal corresponding to frequency of the drive signal based on the error voltage;

a current subtractor for generating an error current from a difference between the output current and a reference current;

a current regulator for generating a current-frequency signal corresponding to the frequency of the drive signal based on the error current;

a comparator for comparing the voltage-frequency signal with the current-frequency signal;

a driving circuit for generating the drive signal; and a control circuit for controlling said driving circuit to generate the drive signal according to the output voltage when it is determined by said comparator that magnitude of the voltage-frequency signal is smaller than that of the current-frequency signal, and for controlling said driving circuit to generate the drive signal according to the output current when it is determined by said comparator that the magnitude of the voltage-frequency signal is greater than that of the current-frequency signal.

13. The control module as claimed in claim 12, wherein, when it is determined by said comparator that the magnitude of the voltage-frequency signal is greater than that of the current-frequency signal, said control circuit controls said driving circuit to adjust frequency of the drive signal according to the output current if the frequency of the drive signal is lower than a predetermined maximum frequency, and controls said driving circuit to adjust duty cycle of the drive signal if otherwise.

14. The control module as claimed in claim 12, wherein, when it is determined by said comparator that the magnitude of the voltage-frequency signal is smaller than that of the current-frequency signal, said control circuit controls said driving circuit to generate the drive signal corresponding to frequency of the voltage-frequency signal.

15. The control module as claimed in claim 12, wherein, when it is determined by said comparator that the magnitude of the voltage-frequency signal is greater than that of the current-frequency signal, said control circuit controls said driving circuit to generate the drive signal corresponding to frequency of the current-frequency signal.

16. A resonant converting device comprising:

a resonant converter for generating an output voltage and an output current and having a power switch; and a control module for generating a drive signal for driving operation of said power switch of said resonant converter to thereby control the output voltage and the output current generated by said resonant converter, said control module including a voltage subtractor for generating an error voltage from a difference between the output voltage and a reference voltage, a voltage regulator for generating a voltage-frequency signal corresponding to frequency of the drive signal based on the error voltage, a current subtractor for generating an error current from a difference between the output current and a reference current, a current regulator for generating a current-frequency signal corresponding to the frequency of the drive signal based on the error current, a comparator for comparing the voltage-frequency signal with the current-frequency signal, a driving circuit for generating the drive signal, and a control circuit for controlling said driving circuit to generate the drive signal according to the output voltage when it is determined by said comparator that magnitude of the voltage-frequency signal is smaller than that of the current-frequency signal, and for controlling said driving circuit to generate the drive signal according to the output current when it is determined by said comparator that the magnitude of the voltage-frequency signal is greater than that of the current-frequency signal.

17. The resonant converting device as claimed in claim 16, wherein, when it is determined by said comparator that the magnitude of the voltage-frequency signal is greater than that of the current-frequency signal, said control circuit controls said driving circuit to adjust frequency of the drive signal according to the output current if the frequency of the drive signal is lower than a predetermined maximum frequency, and controls said driving circuit to adjust duty cycle of the drive signal if otherwise.

18. The resonant converting device as claimed in claim 16, wherein, when it is determined by said comparator that the magnitude of the voltage-frequency signal is smaller than that of the current-frequency signal, said control circuit controls said driving circuit to generate the drive signal corresponding to frequency of the voltage-frequency signal.

19. The resonant converting device as claimed in claim 16, wherein, when it is determined by said comparator that the magnitude of the voltage-frequency signal is greater than that of the current-frequency signal, said control circuit controls said driving circuit to generate the drive signal corresponding to frequency of the current-frequency signal.

* * * * *